(12) United States Patent
Ichihashi et al.

(10) Patent No.: US 12,084,285 B2
(45) Date of Patent: Sep. 10, 2024

(54) CONVEYANCE APPARATUS

(71) Applicant: ISHIDA CO., LTD., Kyoto (JP)

(72) Inventors: Ryo Ichihashi, Ritto (JP); Mikio Kishikawa, Ritto (JP); Yoshiki Horitani, Ritto (JP); Hidemasa Cho, Ritto (JP); Takahide Kasugai, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 119 days.

(21) Appl. No.: 17/821,132

(22) Filed: Aug. 19, 2022

(65) Prior Publication Data
US 2023/0069688 A1 Mar. 2, 2023

(30) Foreign Application Priority Data

Aug. 31, 2021 (JP) .................................. 2021-141770

(51) Int. Cl.
*B65G 27/04* (2006.01)
*B65G 11/16* (2006.01)
*B65G 11/20* (2006.01)
*B65G 27/06* (2006.01)

(52) U.S. Cl.
CPC ............ *B65G 27/04* (2013.01); *B65G 11/203* (2013.01); *B65G 27/06* (2013.01); *B65G 11/163* (2013.01)

(58) Field of Classification Search
None
See application file for complete search history.

(56) References Cited

U.S. PATENT DOCUMENTS

| | | | | |
|---|---|---|---|---|
| 4,478,300 A | * | 10/1984 | Mikami | B65G 11/166 177/128 |
| 5,967,294 A | * | 10/1999 | Patterson | B65G 27/08 198/760 |
| 7,216,757 B1 | * | 5/2007 | Patterson | B65G 27/30 198/764 |
| 9,776,805 B2 | * | 10/2017 | Groenewald | B65G 27/12 |

FOREIGN PATENT DOCUMENTS

| | | |
|---|---|---|
| JP | 2013-000684 A | 1/2013 |
| JP | 2020-023386 A | 2/2020 |
| WO | 2007/147419 A1 | 12/2007 |
| WO | 2014/067533 A1 | 5/2014 |
| WO | 2018/139127 A1 | 8/2018 |

OTHER PUBLICATIONS

The extended European search report issued by the European Patent Office on Jan. 31, 2023, which corresponds to European Patent Application No. 22188632.8-1004 and is related to U.S. Appl. No. 17/821,132.

* cited by examiner

*Primary Examiner* — William R Harp
(74) *Attorney, Agent, or Firm* — Studebaker & Brackett PC

(57) ABSTRACT

A conveyance apparatus (1) according to an embodiment includes: a trough (11) that receives an article from an outside and conveys the article in a conveyance direction from upstream to downstream; and a drive unit (20) that drives the trough. The trough includes a plurality of protrusions (92) on a front surface (91) on which the article is conveyed, and an opening (91A) passing from the front surface to a back surface (93) is formed at an end (92E) on a downstream side of the plurality of protrusions.

10 Claims, 9 Drawing Sheets

CONVEYANCE APPARATUS

CROSS-REFERENCE TO RELATED APPLICATION

This application is based upon and claims the benefit of priority from Japanese Patent Application No. 2021-141770 filed on Aug. 31, 2021 in Japan, the entire contents of which are incorporated herein by reference.

TECHNICAL FIELD

The present invention relates to a conveyance apparatus.

BACKGROUND ART

There has been known a conveyance apparatus including a trough that receives an article from the outside and conveys the article in a conveyance direction from upstream to downstream (e.g., See Patent Literature 1).

SUMMARY OF INVENTION

Technical Problem

However, a conventional trough has a problem that, when a sticky article is conveyed, conveyance control is difficult since even vibration cannot easily move the article.

The present invention has been made in view of the above-described problem, and an object of the present invention is to provide a conveyance apparatus that enables appropriate conveyance control even on a sticky article.

Solution to Problem

A conveyance apparatus according to an embodiment is summarized as including: a trough that receives an article from an outside and conveys the article in a conveyance direction from upstream to downstream; and a drive unit that drives the trough, wherein the trough includes a plurality of protrusions on a front surface on which the article is conveyed, and an opening passing from the front surface to a back surface is formed at an end on a downstream side of the plurality of protrusions.

A conveyance apparatus according to an embodiment is summarized as including: a trough that receives an article from an outside and conveys the article in a conveyance direction from upstream to downstream; and a drive unit that drives the trough, wherein the trough includes: a first sliding surface having a plurality of openings; and a second sliding surface that closes a part of each of the openings and is located at an inner position of the trough than the first sliding surface, and the second sliding surface is continuous with the first sliding surface on an upstream side, a left side, and a right side of each of the openings.

Advantageous Effects of Invention

According to the present invention, it is possible to provide a conveyance apparatus that enables appropriate conveyance control even on a sticky article.

DETAILED DESCRIPTION

Figure 1:
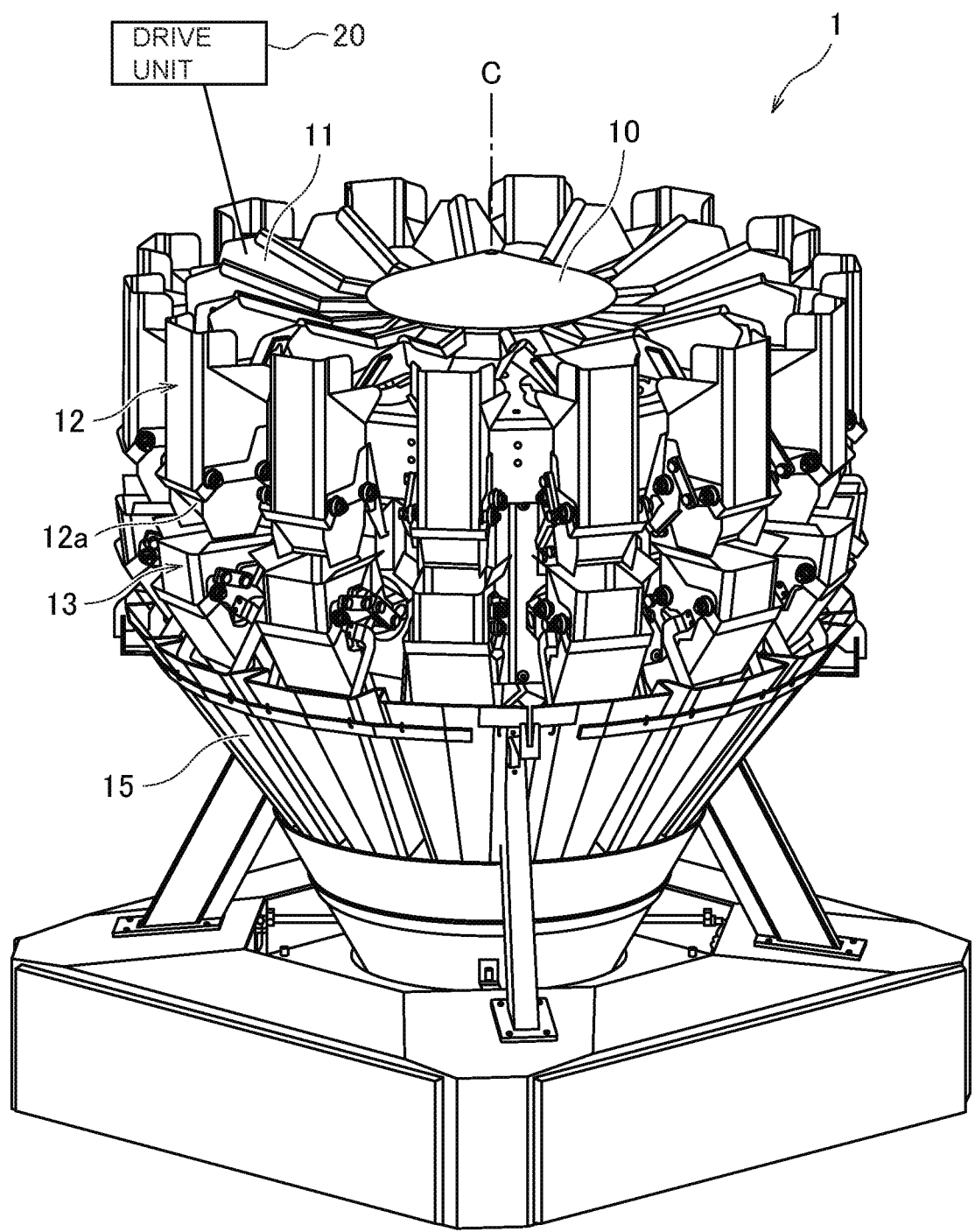
FIG. 1 illustrates one example of an overall configuration of a conveyance apparatus according to an embodiment.

Hereinafter, the present embodiment will be described in detail with reference to the attached drawings. In the following description of the drawings, the same or similar parts are denoted by the same or similar reference symbols. However, note that the drawings are schematic, and ratios of dimensions are different from actual ones. Therefore, specific dimensions and the like are determined in consideration of the following description. Moreover, there may be portions where dimensional relationships or proportions are different among the drawings. In this specification and the drawings, elements having substantially the same function and configuration are denoted by the same reference numerals to omit redundant description, and elements not directly related to the present invention are omitted.

First Embodiment

A conveyance apparatus 1 according to a first embodiment of the present invention will be described below with reference to FIGS. 1 to 6.

Although, in the embodiment, a case where the conveyance apparatus 1 is a weighing device that weighs a mass value of an article with a Roberval mechanism will be described in an example, the present invention is not limited to such a case.

As illustrated in FIG. 1, the conveyance apparatus 1 according to the embodiment includes a dispersion table 10, troughs 11, pool hoppers 12, weighing hoppers 13, collection discharge chutes 15, and a drive unit 20.

The dispersion table 10 disperses articles (objects to be measured) falling from a supply device (not illustrated) toward the troughs 11.

For example, the dispersion table 10 in the embodiment conveys articles radially outward while circumferentially dispersing the articles by being vibrated by a vibrating mechanism (not illustrated). Note that the dispersion table 10 is not limited to such configuration, and may be a mechanism that conveys articles toward the troughs 11 by rotationally driving around a vertically extending rotation axis C. In other words, the dispersion table 10 may have any configuration as long as the dispersion table 10 has a function of conveying such articles toward the troughs 11.

For example, such articles include soft and sticky food such as raw chicken. The articles are, however, not limited thereto. Specifically, the dispersion table 10 can convey any article such as fruit including prunes and sugar-coated candies.

The troughs 11 receives articles from the outside, and conveys the articles in a conveyance direction from upstream to downstream. In the embodiment, the troughs 11 supply the articles supplied from the dispersion table 10 to the pool hoppers 12 each provided downstream. The drive unit 20 drives the troughs 11.

The pool hoppers 12 temporarily hold the articles supplied from the troughs 11. Gate 12a are provided at lower portions of the pool hoppers 12. The objects to be measured held in the pool hoppers 12 are discharged to the weighing hoppers 13 provided below the gates 12a by opening/closing operations of the gates 12a.

The weighing hoppers 13 temporarily hold the articles discharged by the pool hoppers 12. Gates (not illustrated) are provided at lower portions of the weighing hoppers 13. The articles held in the weighing hoppers 13 are discharged to the collection discharge chutes 15 provided below the gates by opening/closing operations of the gates.

The collection discharge chutes 15 collect the articles discharged from the plurality of weighing hoppers 13, and drop the articles downward.

One example of the troughs 11 of the conveyance apparatus 1 according to the embodiment will be described below with reference to FIGS. 2 to 4.

Figure 2:
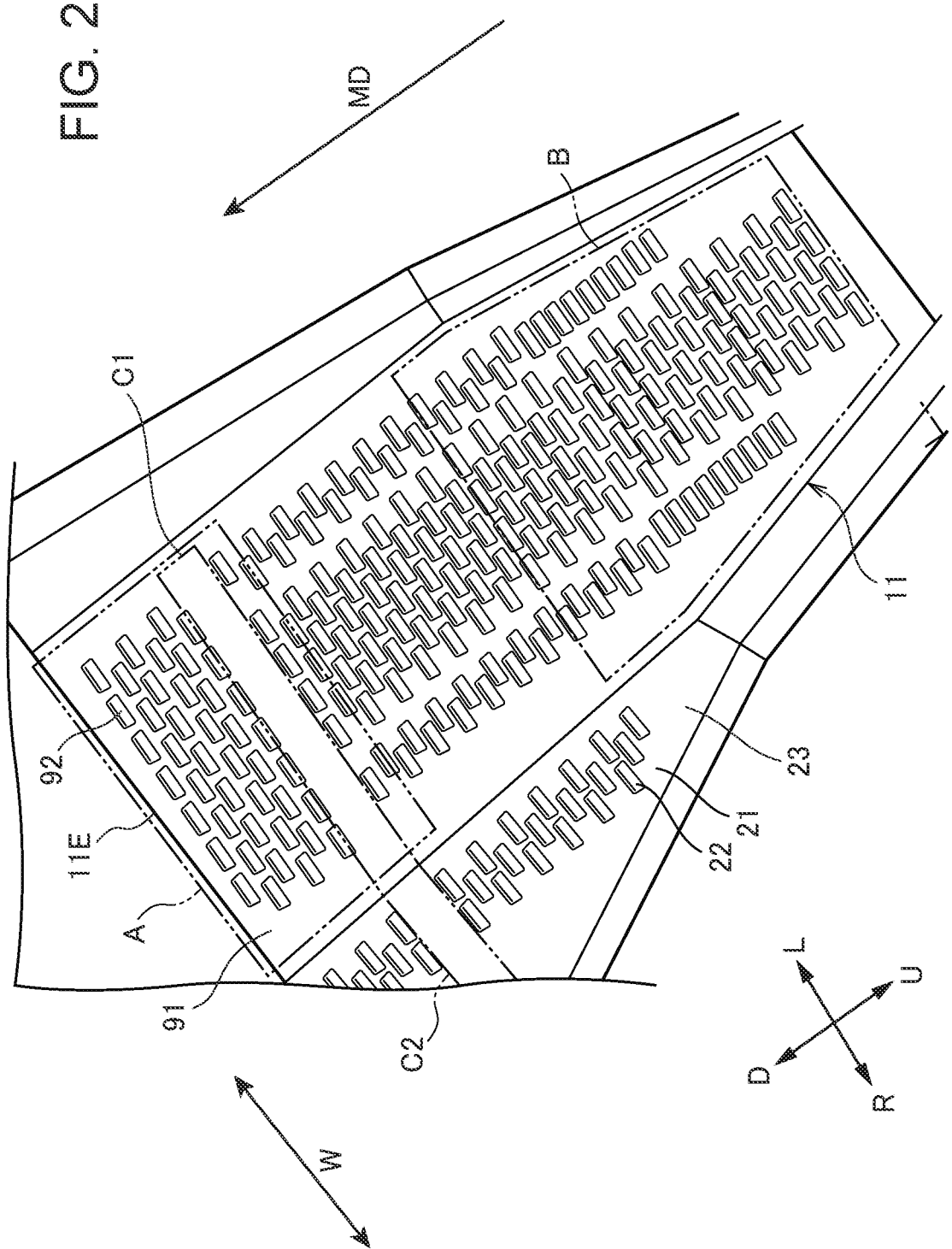
FIG. 2 illustrates one example of a trough of the conveyance apparatus according to the embodiment.

As illustrated in FIG. 2, each of the troughs 11 has a plurality of protrusions 92 on a front surface 91 on which an article is conveyed. That is, the front surface 91, on which an article is conveyed, of each of the troughs 11 is subjected to shutter processing. The shutter processing may be louver processing. The surface 91 subjected to the shutter processing has structure in which the other side of each of the troughs 11 is invisible when the front surface 91 is viewed from the front and the other side of each of the troughs 11 is made visible by shifting a viewpoint.

Figure 3:
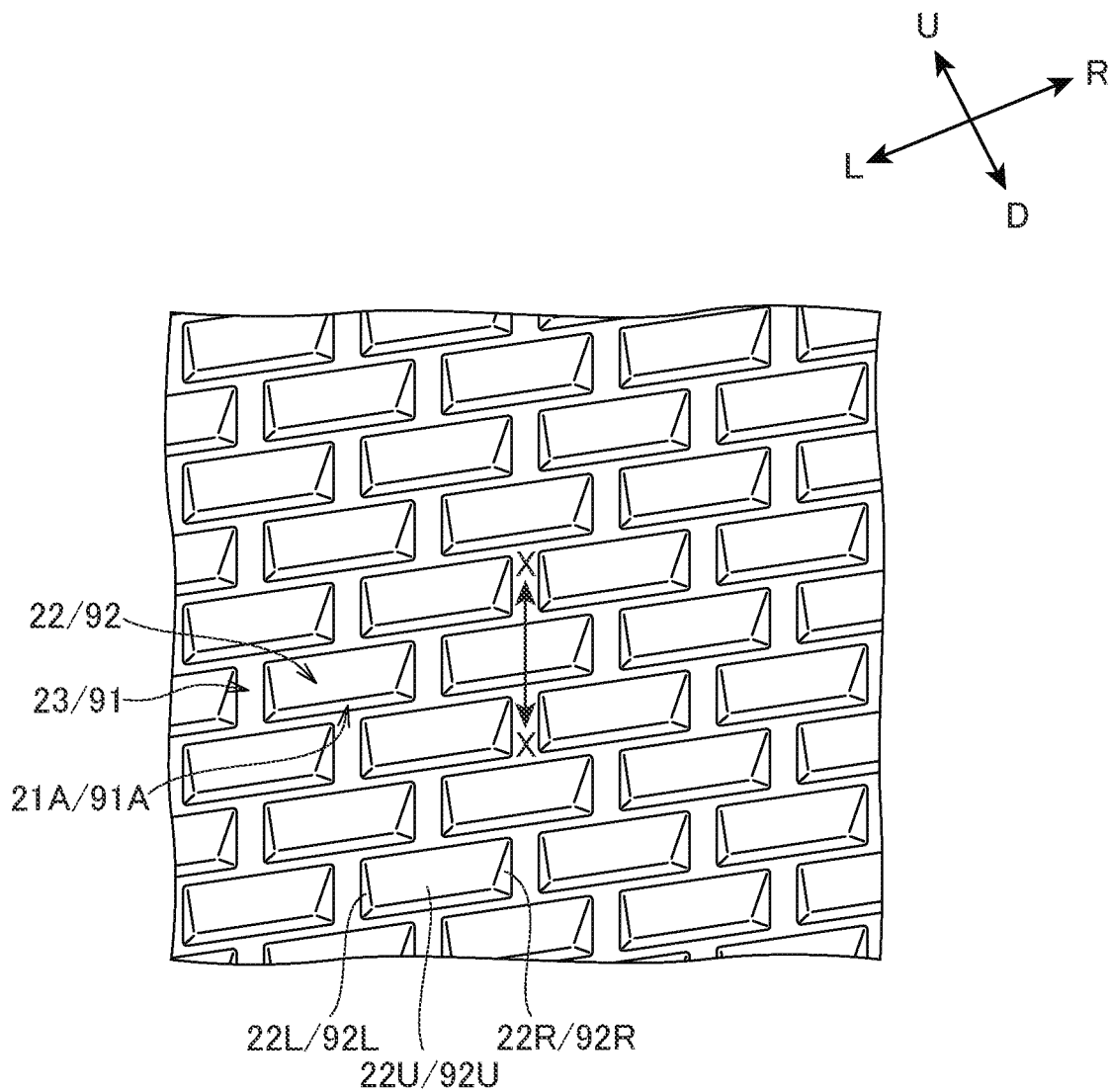
FIG. 3 illustrates a part of a front surface, on which an article is conveyed, of the trough of the conveyance apparatus according to the embodiment.
Figure 4:
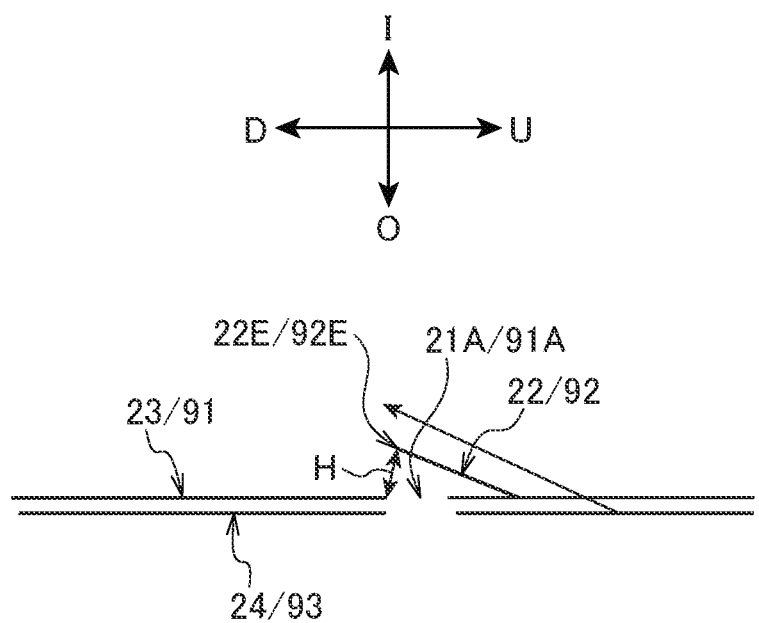
FIG. 4 is an X-X cross-sectional view in FIG. 3.

As illustrated in FIGS. 3 and 4, openings 91A passing from the front surface 91 toward a back surface 93 are formed at ends 92E on the downstream side of the plurality of protrusions 92.

In other words, as illustrated in FIGS. 3 and 4, each of the troughs 11 has a first sliding surface 91 and second sliding surfaces 92. The first sliding surface 91 has the plurality of openings 91A. The second sliding surfaces 92 close parts of the openings 91A, and are located on an inner side I of each of the troughs 11 than the first sliding surface 91.

Each of the second sliding surfaces 92 is continuous with the first sliding surface 91 on an upstream side U, a left side L, and a right side R of each of the above-described openings 91A.

Specifically, as illustrated in FIG. 3, each of the second sliding surfaces 92 has a left flat surface 92L, a right flat surface 92R, and an upper flat surface 92U.

Here, as illustrated in FIG. 3, the left flat surface 92L stands from the first sliding surface 91 toward the inner side I on the left side L of each of the openings 91A.

As illustrated in FIG. 3, the right flat surface 92R stands from the first sliding surface 91 toward the inner side I on the right side R of each of the openings 91A.

As illustrated in FIG. 3, the upper flat surface 92U couples the left flat surface 92L with the right flat surface 92R.

As illustrated in FIG. 4, driving force and the like from the drive unit 20 slide an article from an upper side U to a lower side D along the first sliding surface 91 and the upper flat surfaces 92U of the second sliding surfaces 92 on the front surface 91, on which an article is conveyed, of each of the troughs 11.

The protrusions (second sliding surfaces) 92 are provided on the front surface 91, on which an article is conveyed, of each of the troughs 11. Such configuration can reduce an area of contact between a highly sticky article and the front surface 91, reduce adhesion of the article to the front surface 91, and enable appropriate conveyance control.

Even when a highly sticky article comes into contact with the front surface 91, air flows in from each of the openings 91A. A layer of air can thus be formed between the front surface 91 and the article, and atmospheric pressure is applied to also a portion where the surface 91 and the article are in contact with each other. This configuration can reduce adhesion of the article to the front surface 91.

The end 92E restricts backward movement of the article, so that the article is smoothly conveyed downstream.

As illustrated in FIG. 2, a density D1 of the protrusions 92 in a first region A near an end 11E on the downstream side of each of the troughs 11 may be smaller than a density D2 of the protrusions 92 in a second region B, which is located on the upstream side of the region A near the end 11E on the downstream side of each of the troughs 11.

Here, the density D1 may be made smaller than the density D2 by making the distances between the protrusions 92 in the first region A longer than the distances between the protrusions 92 in the second region B.

The density D1 may be made smaller than the density D2 by providing a region with no protrusions 92 (region C1 in example of FIG. 2) in a part of the first region A.

According to such configuration, a conveying speed on the front surface 91 of each of the troughs 11 is inhibited by intentionally deteriorating article conveying performance in the region A near the end 11E on the downstream side of each of the troughs 11. The configuration can prevent articles from excessively flowing. The configuration decelerates an article at an end portion of each of the troughs 11, so that unintentional falling of the article to each of the pool hoppers 12 can be reduced.

For example, when an elastic article such as meat is conveyed, a contact area is increased with deformation of the article in the region A near the end 11E on the downstream side of each of the troughs 11, so that the conveying speed is inhibited.

A height H (see FIG. 4) of each of the protrusions 92 in the first region A of each of the troughs 11 may be lower than a height H of each of the protrusions 92 in the second region B of each of the troughs 11.

Such configuration can reduce an amount of air flowing from each of the openings 91A when a highly sticky article comes into contact with the front surface 91 in the first region A. A layer of air between the front surface 91 and the article is thus made thin. In the configuration, the adhesion of the article to the front surface 91 remains, and an article conveying speed can be inhibited as compared with the case of the second region B. This configuration prevents the article from excessively flowing. As a result, unintentional falling of the article to each of the pool hoppers 12 can be reduced.

As illustrated in FIG. 2, the conveyance apparatus 1 according to the embodiment may have upright portions 21. The upright portions 21 stand upright from the front surface 91 at both ends in a width direction W intersecting a conveyance direction MD of each of the troughs 11. Here, as illustrated in FIG. 2, each of the upright portions 21 may have a plurality of protrusions 22 on an inner front surface 23 in the width direction W.

As illustrated in FIGS. 3 and 4, openings 21A passing from the front surface 23 toward a back surface 24 may be formed at ends 22E on the downstream side of the plurality of protrusions 22 of each of the upright portions 21.

In other words, as illustrated in FIGS. 3 and 4, each of the troughs 11 has a first sliding surface 23 and second sliding surfaces 22. The first sliding surface 23 has the plurality of openings 21A. The second sliding surfaces 22 close parts of the openings 21A, and are located on the inner side I of each of the troughs 11 than the first sliding surface 23.

Each of the second sliding surfaces 22 is continuous with the first sliding surface 23 on an upstream side U, a left side L, and a right side R of each of the above-described openings 21A.

Specifically, as illustrated in FIG. 3, each of the second sliding surfaces 22 has a left flat surface 22L, a right flat surface 22R, and an upper flat surface 22U.

Here, as illustrated in FIG. 3, the left flat surface 22L stands from the first sliding surface 23 toward the inner side I on the left side L of each of the openings 21A.

As illustrated in FIG. 3, the right flat surface 22R stands from the first sliding surface 23 toward the inner side I on the right side R of each of the openings 21A.

As illustrated in FIG. 3, the upper flat surface 22U couples the left flat surface 22L with the right flat surface 22R.

According to such configuration, the article conveying speed can be more reliably controlled by providing the protrusions 22 on each of the upright portions 21 with which a side surface of the article comes in contact.

Figure 5:
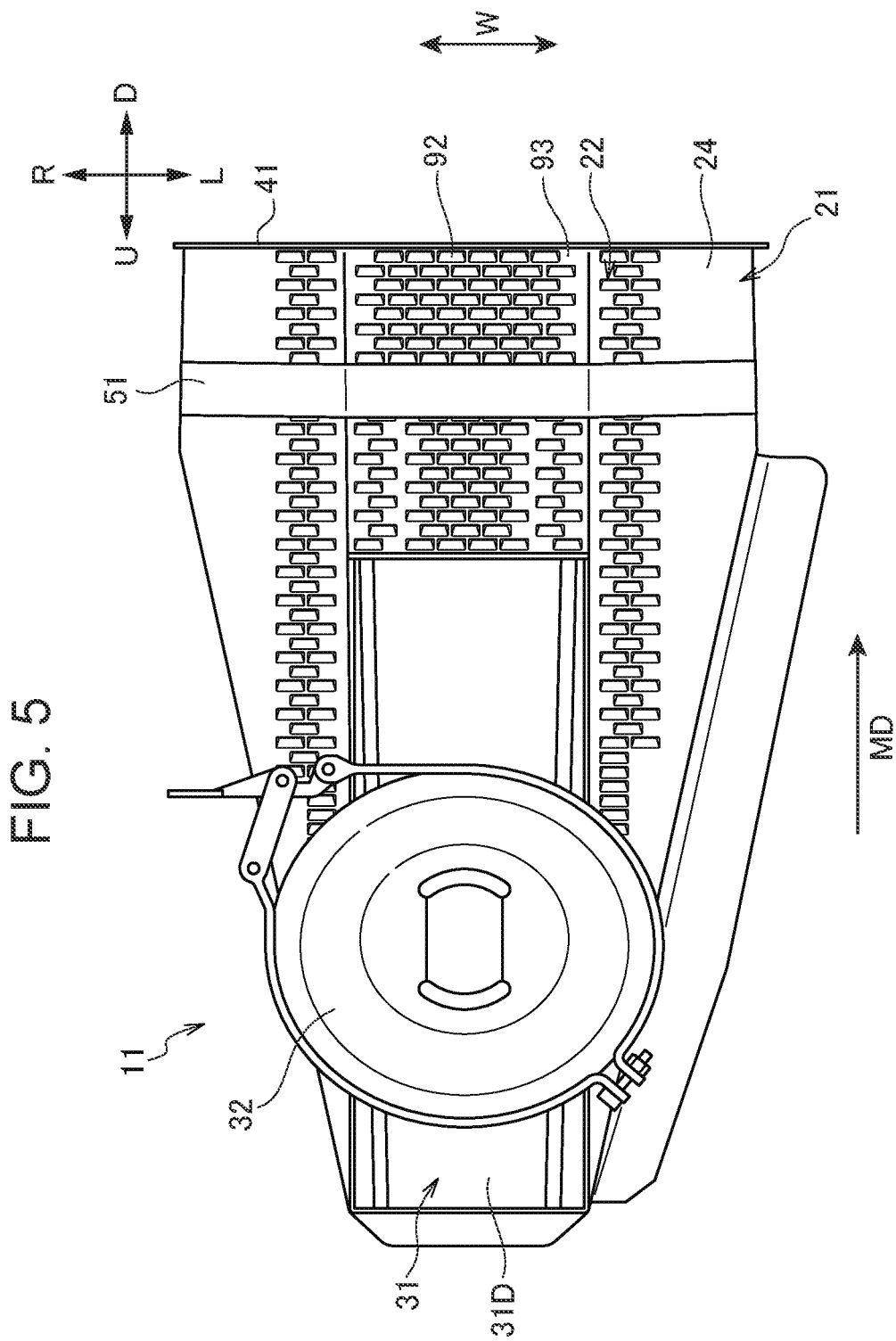
FIG. 5 illustrates the trough of the conveyance apparatus according to the embodiment as viewed from the side of a back surface.

As illustrated in FIG. 5, the conveyance apparatus 1 according to the embodiment may include reinforcing members 51 on the side of the back surface 93 in the first region A near the end 11E on the downstream side of each of the troughs 11. As illustrated in FIG. 2, no protrusions 92 may be provided in the region C1 on the front surface opposite to the region on the back surface 93 where each of the reinforcing members 51 is provided.

As illustrated in FIG. 5, each of the reinforcing member 51 may extend to the back surface 24 of each of the upright portions 21. In such a case, as illustrated in FIG. 2, no protrusions 92 may be provided in the region C2 on the front surface opposite to the region on the back surface 24 where each of the reinforcing members 51 is provided.

Such configuration can increase the strength of each of the troughs 11 while making the density D1 smaller than the density D2.

Here, the reinforcing member 51 provided on the side of the back surface 93 in the first region A and the reinforcing member 51 provided on the side of the back surface 24 of each of the upright portions 21 may be integrated, or may be formed of different members.

As illustrated in FIG. 5, the conveyance apparatus 1 according to the embodiment may include attachments 31 and joints 32.

Figure 6:
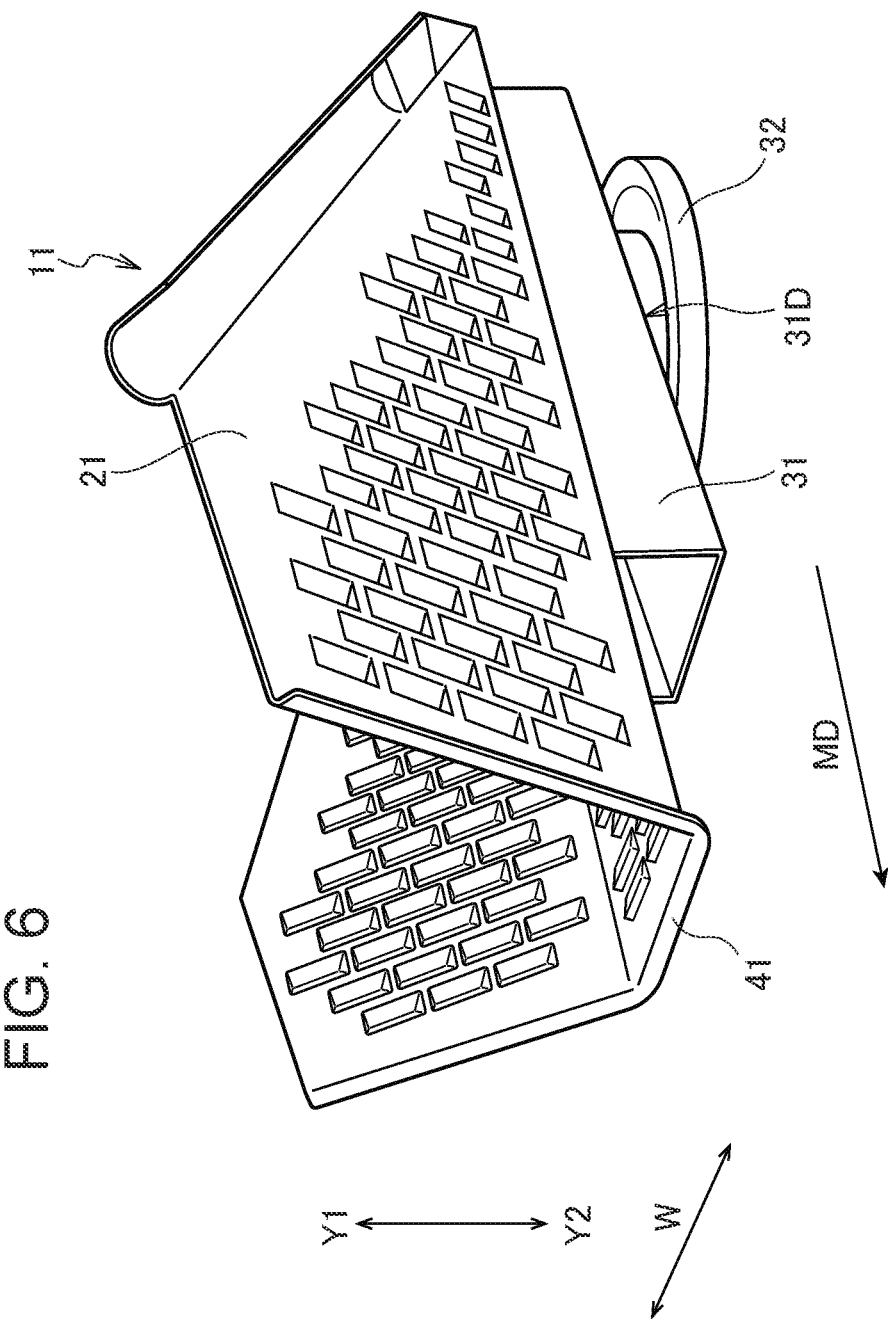
FIG. 6 illustrates one example of the trough of the conveyance apparatus according to the embodiment.

As illustrated in FIG. 6, each of the attachments 31 extends in the conveyance direction MD, and includes a member having a U-shaped cross section with an upper side open. For example, as illustrated in FIGS. 2 and 6, each of the attachments 31 is attached to a region of each of the troughs 11 with no protrusions 92.

Each of the joints 32 is attached to each of the attachments 31, and is detachable from a main body of the conveyance apparatus 1. For example, as illustrated in FIG. 6, each of the joints 32 is attached to a lower surface 31D of each of the attachments 31. As illustrated in FIG. 5, each of the joints 32 has a circular shape corresponding to an attachment (not illustrated) of the main body of the conveyance apparatus 1.

In such configuration, each of the attachments 31 is attached to a region of each of the troughs 11 with no protrusions 92. Each of the troughs 11 can thus be attached to the main body of the conveyance apparatus 1 without influencing the arrangement of the protrusions 92 in each of the troughs 11.

As illustrated in FIG. 6, the conveyance apparatus 1 according to the embodiment may include ribs 41 bent toward the side of the back surface 93 at the end 11E on the downstream side of each of the troughs 11. As illustrated in FIG. 6, each of the ribs 41 may extend to the end on the downstream side of each of the upright portions 21. Such configuration can further enhance the strength of each of the troughs 11.

Figure 7:
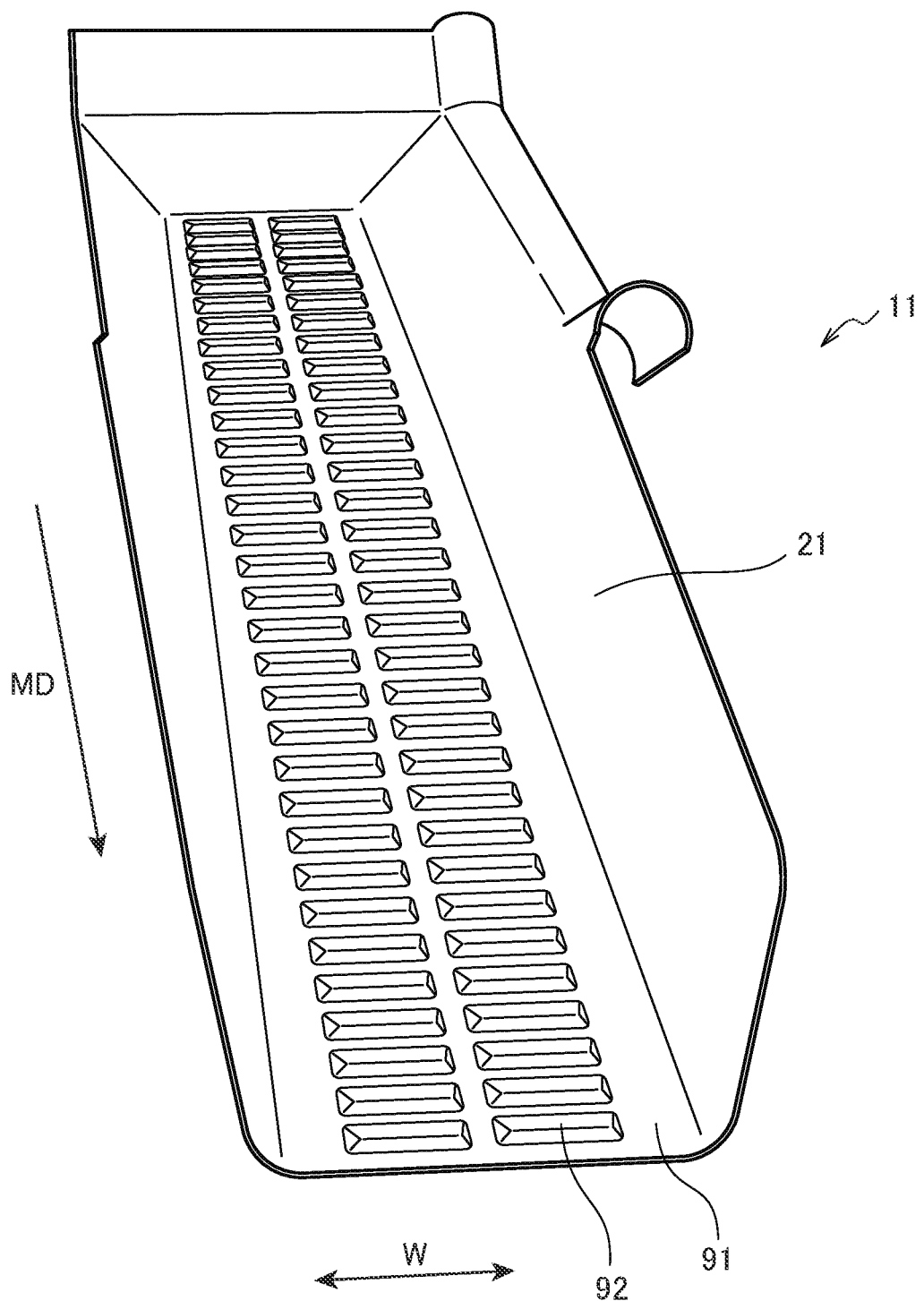
FIG. 7 illustrates one example of an arrangement pattern of a plurality of protrusions on the front surface, on which an article is conveyed, of the trough of the conveyance apparatus according to the embodiment.
Figure 8:
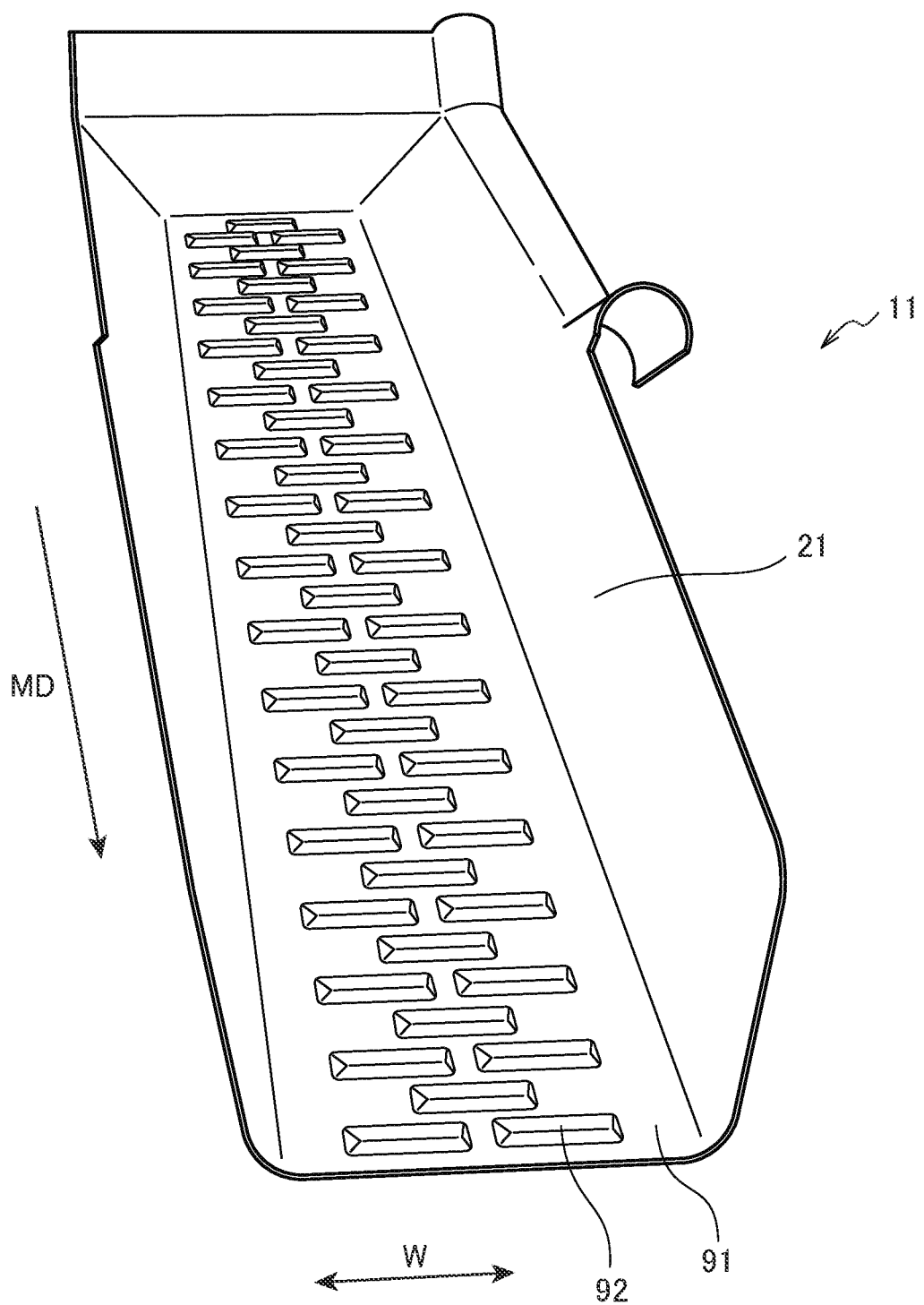
FIG. 8 illustrates one example of the arrangement pattern of the plurality of protrusions on the front surface, on which an article is conveyed, of the trough of the conveyance apparatus according to the embodiment.
Figure 9:
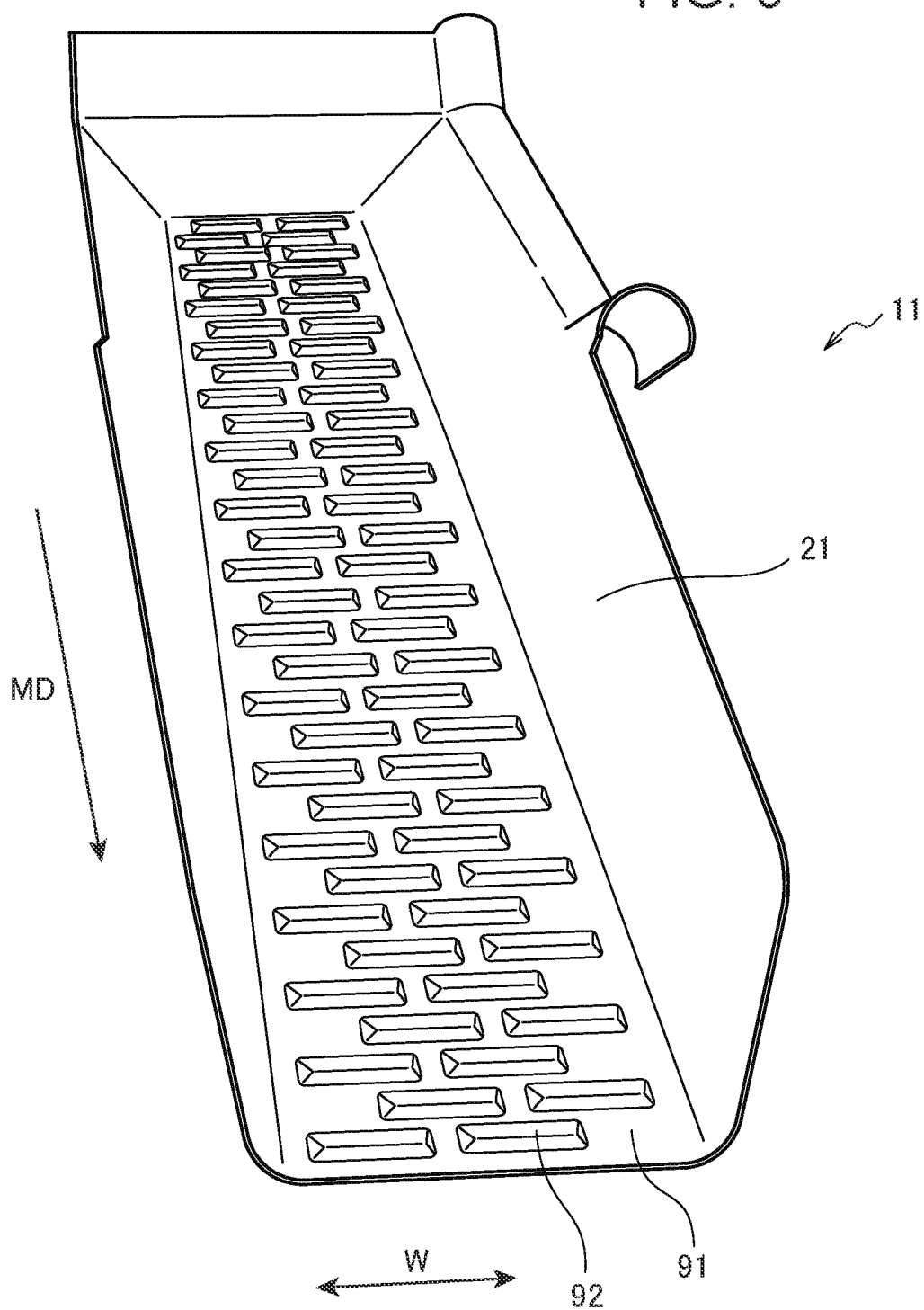
FIG. 9 illustrates one example of the arrangement pattern of the plurality of protrusions on the front surface, on which an article is conveyed, of the trough of the conveyance apparatus according to the embodiment.

In the conveyance apparatus 1 according to the embodiment, as illustrated in FIGS. 7 to 9, the plurality of protrusions 92 may be arranged along the conveyance direction MD on the front surface 91.

For example, as illustrated in FIG. 7, the plurality of protrusions 92 may be arranged in a plurality of lines parallel to the conveyance direction MD on the front surface 91. Although, in an example of FIG. 7, two lines are formed by the arrangement of the protrusions 92, three or more lines may be formed.

In the conveyance apparatus 1 according to the embodiment, as illustrated in FIG. 8, the numbers of the protrusions 92 arranged along the width direction W may be different from each other depending on the positions in the conveyance direction MD. Although, in an example of FIG. 8, positions where one protrusion 92 is arranged along the width direction W and positions where two protrusions 92 are arranged along the width direction W are mixed along the conveyance direction MD, the number of the protrusions 92 arranged along the width direction W is not limited to such numbers, and any number of protrusions 92 may be arranged.

In the conveyance apparatus 1 according to the embodiment, as illustrated in FIG. 9, the numbers of the protrusions 92 arranged along the width direction W may be the same as each other regardless of the positions in the conveyance direction MD. Here, as illustrated in FIG. 9, the positions of the protrusions 92 in the width direction W may be different from each other depending on the positions in the conveyance direction MD. Although, in an example of FIG. 9, a case in which two protrusions 92 are arranged along the width direction W has been described, the present invention is not limited to such a case. The present invention is applied to a case where three or more protrusions 92 are arranged along the width direction W.

The embodiment of the present invention has been described in detail above. It is obvious to a person skilled in the art that the present invention is not limited to the embodiment in the present specification. The present invention can be carried out in aspects corrected and altered without departing from the gist and scope of the present invention in the claims. Therefore, the present specification is intended for exemplificative description and thus does not have any limitative meanings to the present invention. ding surface)

What is claimed is:

1. A conveyance apparatus comprising:
a trough that receives an article from an outside and conveys the article in a conveyance direction from upstream to downstream; and
a drive unit that drives the trough, wherein
the trough includes:
- a first sliding surface having a plurality of openings; and
- a second sliding surface that closes a part of each of the openings and is located at a more inward position of the trough than the first sliding surface, and the second sliding surface is continuous with the first sliding surface on an entirety of each of an upstream side, a left side, and a right side of each of the openings.

2. The conveyance apparatus according to claim 1, wherein
the second sliding surface has a plurality of protrusions on a front surface on which the article is conveyed, and
each opening of the first sliding surface passes from the front surface to a back surface and is formed at an end on a downstream side of one of the plurality of protrusions.

3. The conveyance apparatus according to claim 2, wherein
a density of the protrusions in a first region near an end on a downstream side of the trough is smaller than a density of the protrusions in a second region located on an upstream side of the first region.

4. The conveyance apparatus according to claim 2, wherein
heights of the protrusions in a first region near an end on a downstream side of the trough are smaller than heights of the protrusions in a second region located on an upstream side of the first region.

5. The conveyance apparatus according to claim 2, comprising a pair of upright portions, each of which stands upright from the front surface at a respective lateral edge of the front surface, wherein
each of the upright portions includes a plurality of protrusions on an inner front surface of the upright portion, and
an opening passing from the inner front surface to a back surface is formed at a downstream side of the plurality of protrusions of each of the upright portions.

6. The conveyance apparatus according to claim 2, comprising a reinforcing member on a side of the back surface in a first region near an end on the downstream side of the trough, wherein
the protrusions are not provided in a region on the front surface opposite to a region on the back surface where the reinforcing member is provided.

7. The conveyance apparatus according to claim 2, comprising:
an attachment having a U-shaped cross section, the attachment being attached to a region where the protrusions in the trough are not provided, extending in the conveyance direction, and having an upper side open; and
a joint that is attached to a lower surface of the attachment and detachable from a main body of the conveyance apparatus.

8. The conveyance apparatus according to claim 2, comprising a rib bent toward the side of the back surface at an end on the downstream side of the trough.

9. The conveyance apparatus according to claim 2, wherein
the plurality of protrusions are arranged in a plurality of lines parallel to the conveyance direction.

10. The conveyance apparatus according to claim 1, wherein each second sliding surface includes:
a left flat surface rising from the first sliding surface toward the inner side on the left side of the corresponding one of the plurality of openings;
a right flat surface rising from the first sliding surface toward the inner side on the right side of the corresponding one of the plurality of openings; and
an upper flat surface that connects the left flat surface with the right flat surface.

* * * * *